United States Patent Office 3,330,236
Patented July 11, 1967

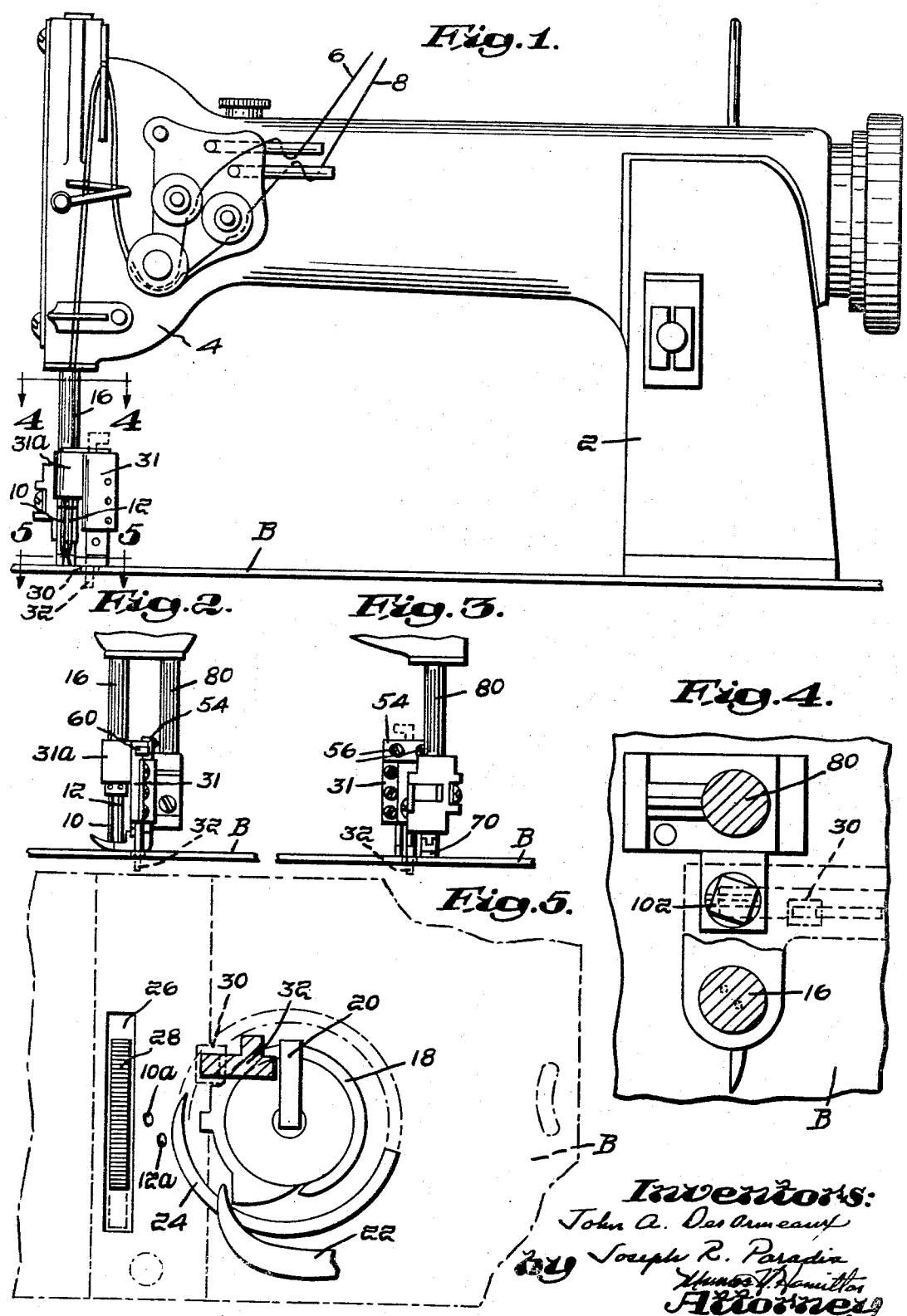

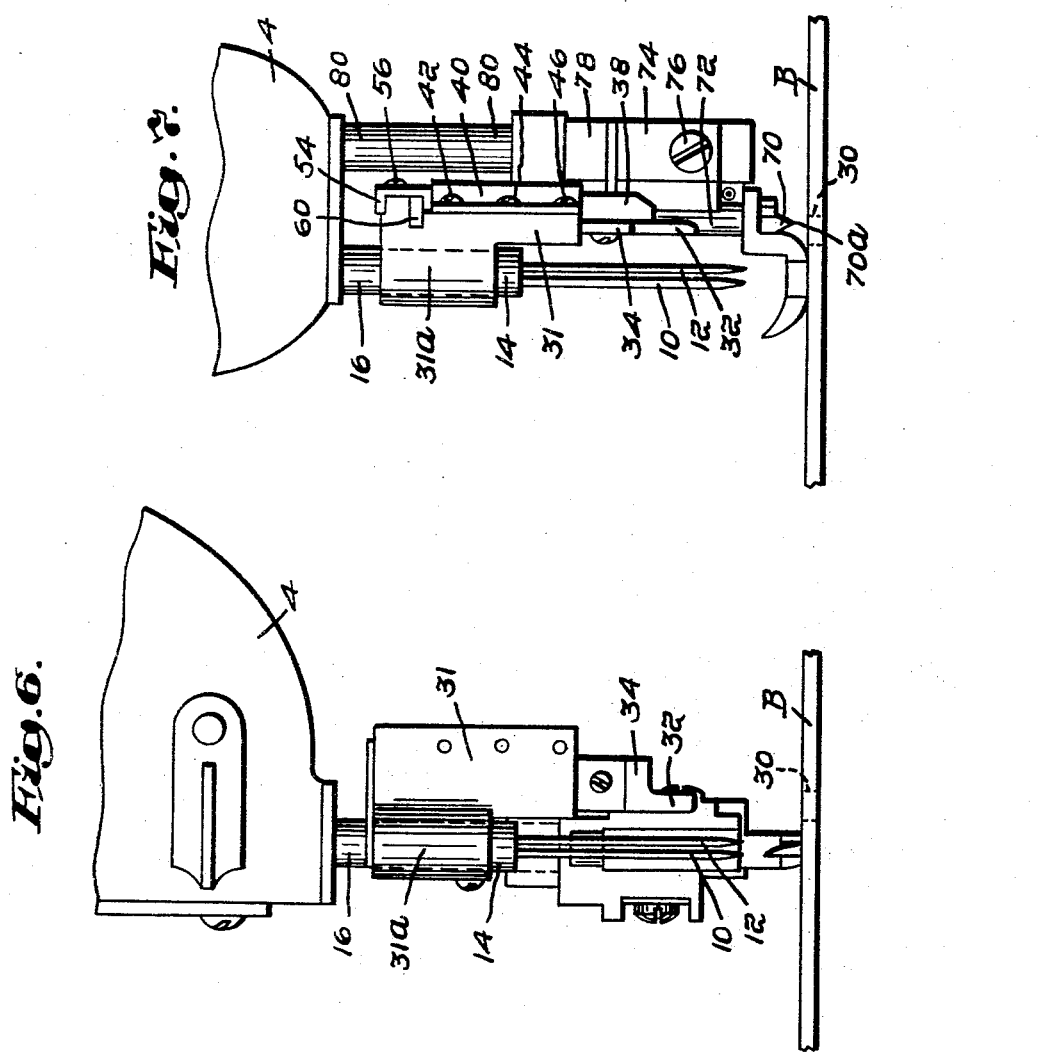

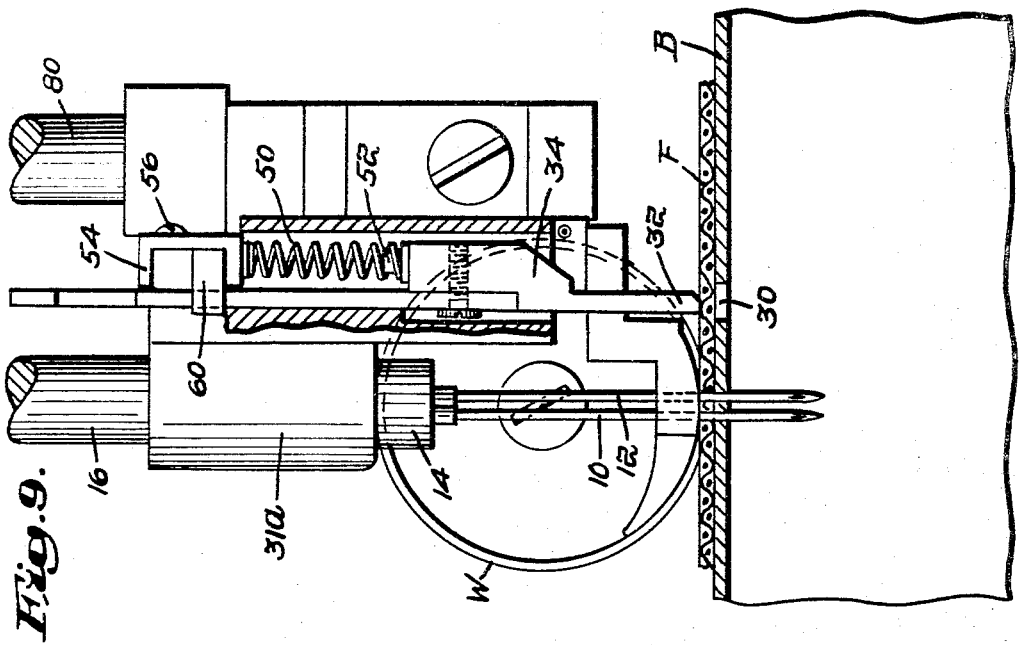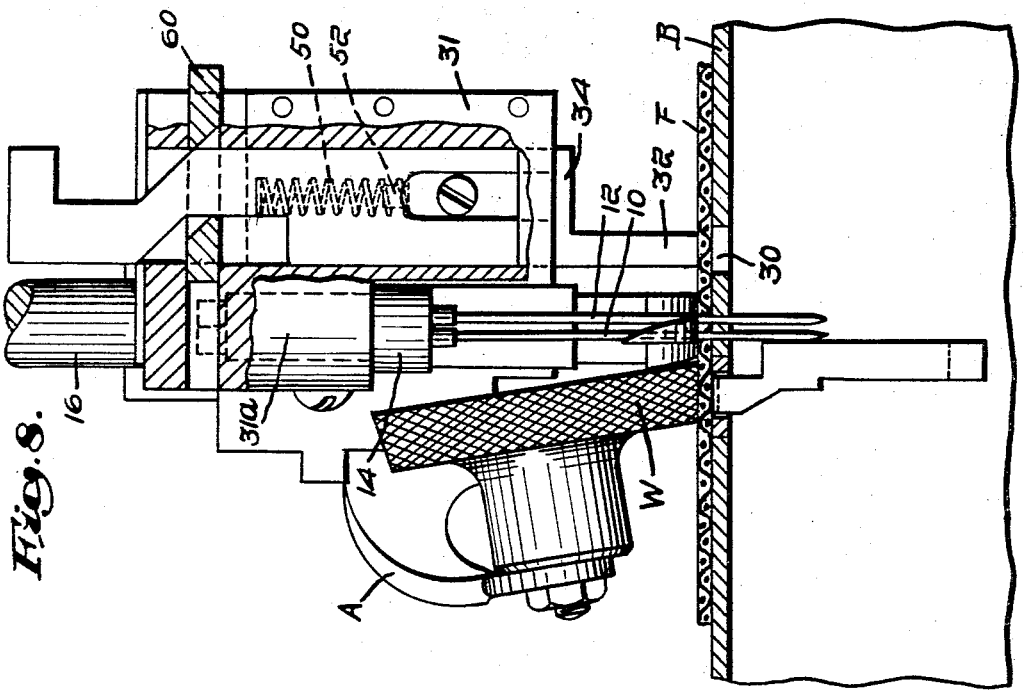

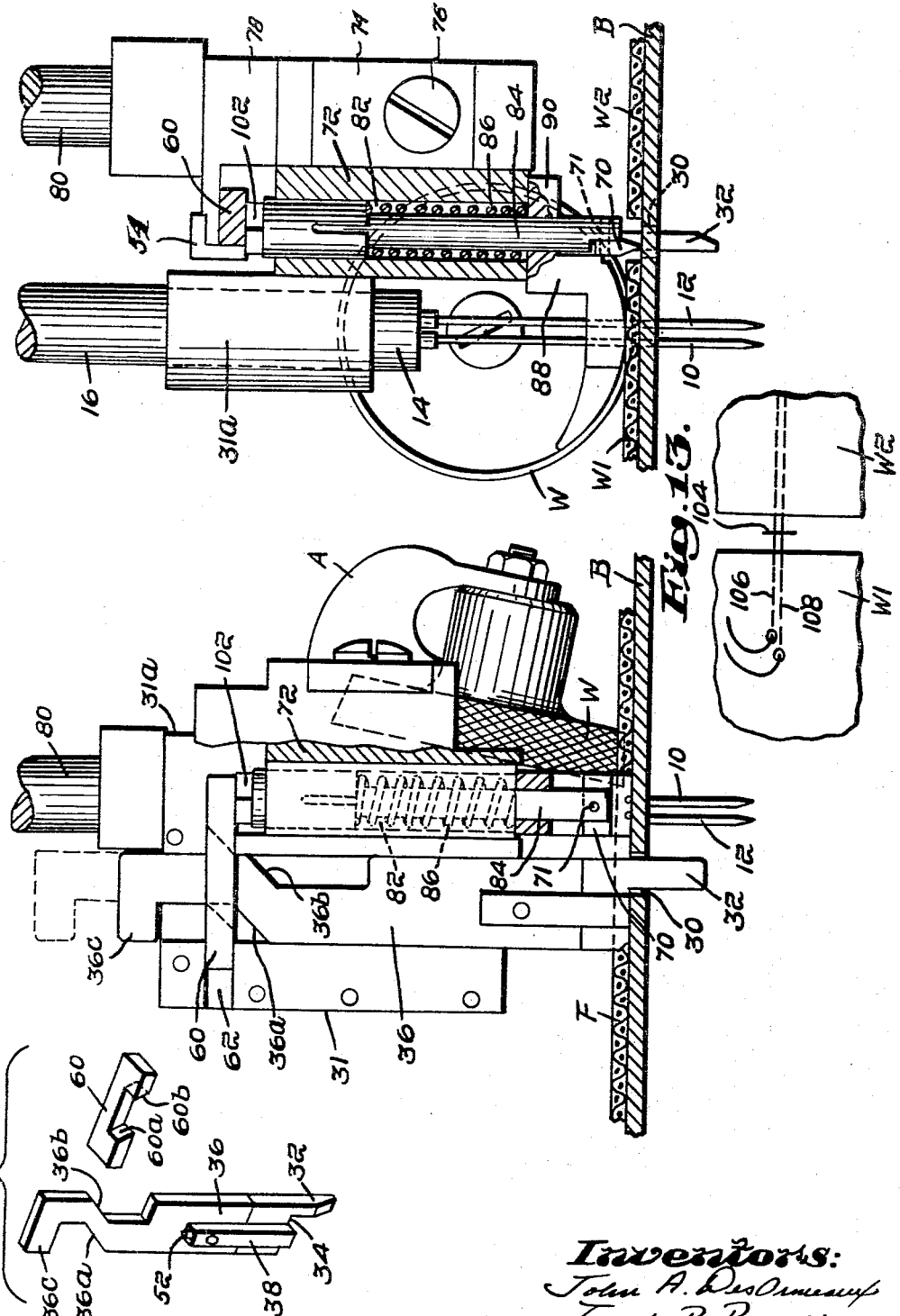

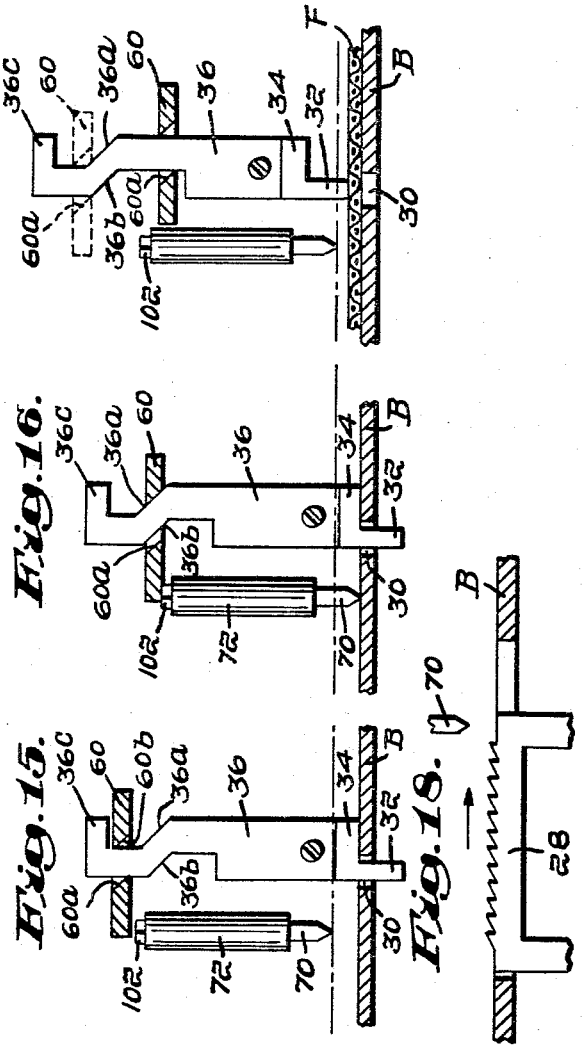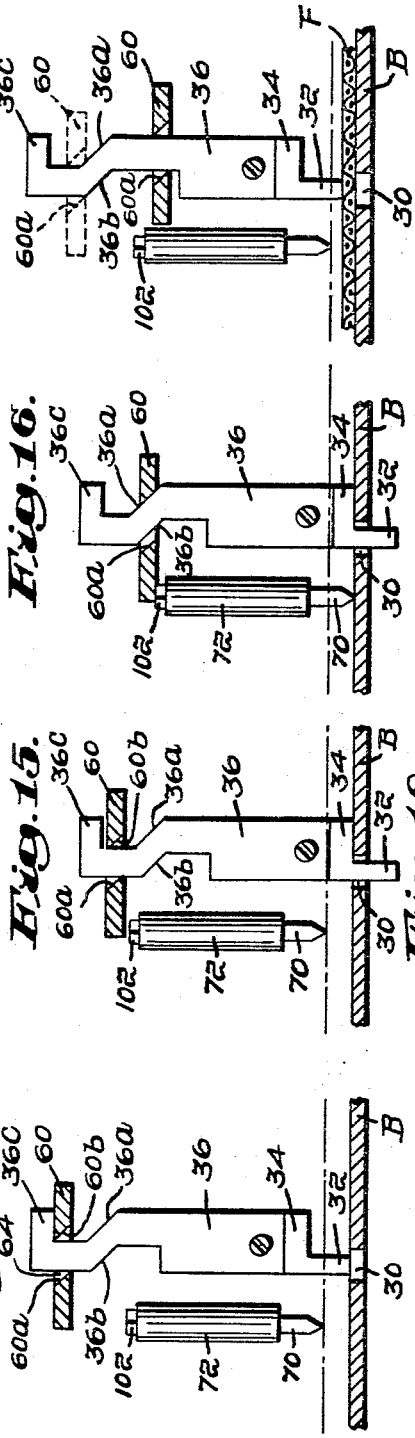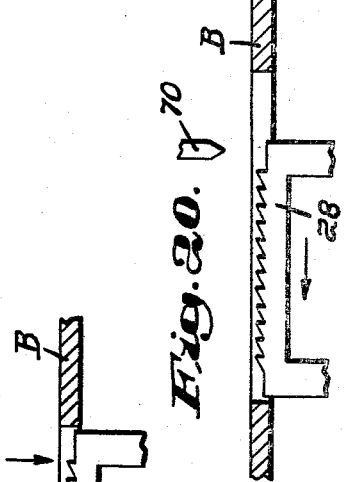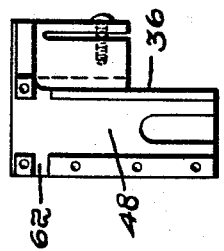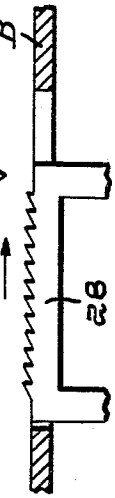

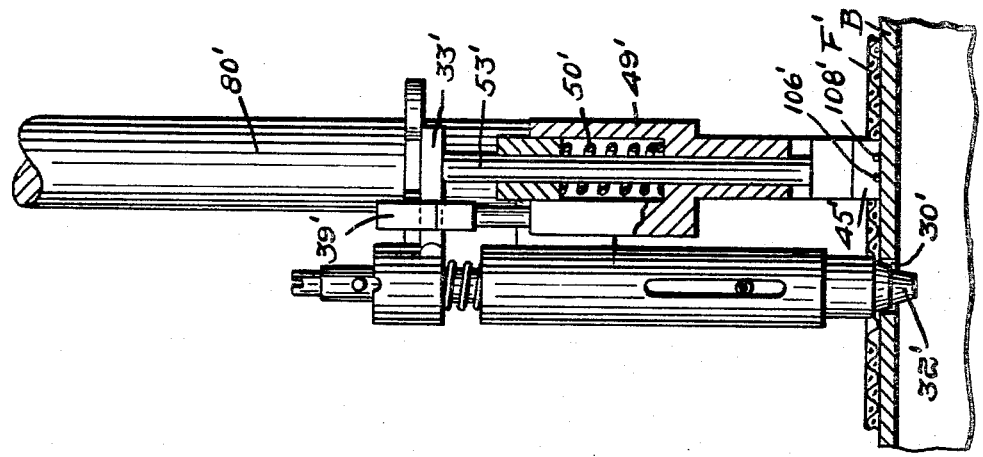
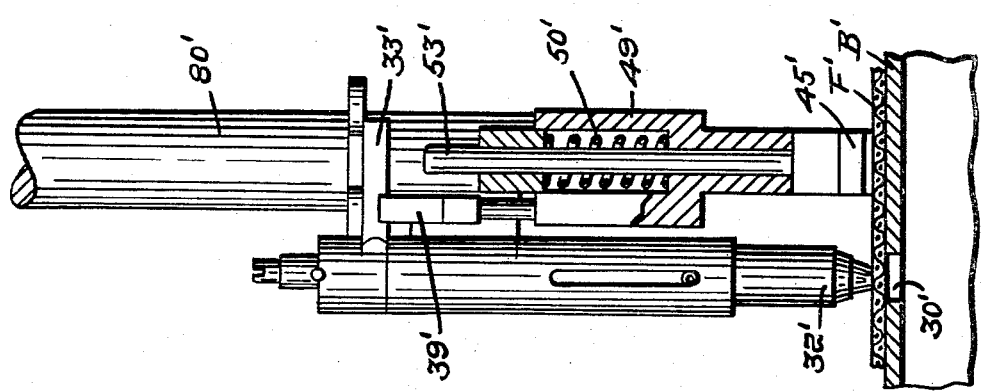
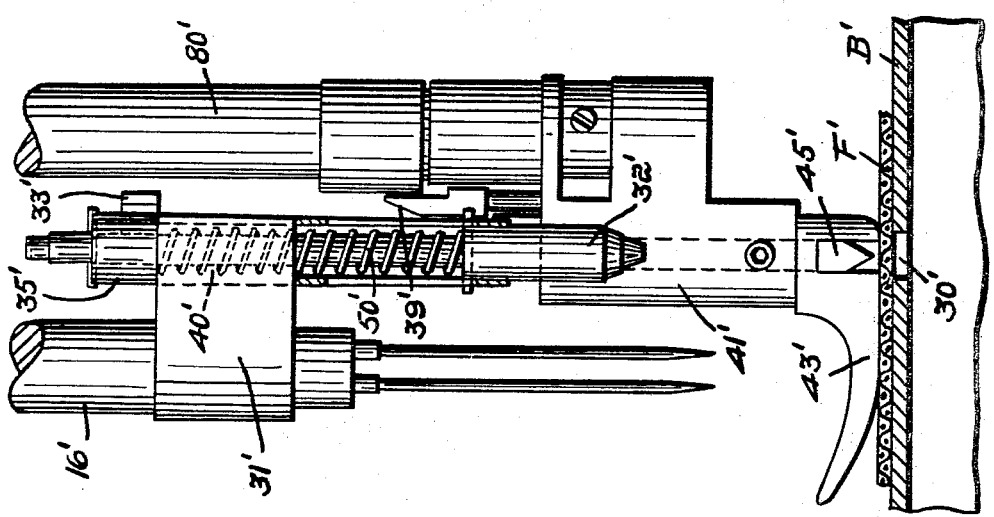

3,330,236
CUTTING MECHANISMS FOR SEWING MACHINE AND METHOD OF CUTTING MATERIAL
John A. Des Ormeaux, Bradford, and Joseph R. Paradis, Wayland, Mass., assignors to Frederic P. Worthen
Filed July 24, 1964, Ser. No. 384,929
19 Claims. (Cl. 112—252)

This invention relates to cutting methods and mechanisms and, more particularly, to cutting mechanisms for cutting thread, tape and similar fastening materials employed in sewing machines. Reference is had especially to sewing machines of the general type in which a vertically oscillatable needle bar with needle holder and needles are arranged to carry out a stitching operation on a piece of fabric moved under a stationary presser foot by means of a cloth feeding mechanism. The invention is also applicable to sewing machines of the type equipped with alternating presser feet as well as presser roll type machines.

In conventional sewing machine operation a problem arises in cutting off thread or other fastening material at the point at which a stitching operation is completed on one workpiece and continued on another workpiece immediately advanced along the work supporting base of the machine. Various forms of conventional cutting mechanisms have been proposed for this purpose and these machines are customarily located rearwardly of the presser foot. In this relative position it frequently happens that interference or jamming may develop from irregular movement of the cloth and this may result in faulty cutting, loss of operator time and lowered efficiency.

It is a principal object of the present invention to deal with the cutting problem indicated and to devise improved cutting methods and means which will automatically perform a desired cutting step with respect to thread, tape, binding, or other material at predetermined points without interruption of the stitching operation as it passes from one workpiece to another.

It is further an object of the invention to devise a cutting mechanism which may be embodied in the form of attachment members conveniently mounted on standard sewing machine needle bars and presser foot bars with only minor alteration of these members as they occur in conventional sewing machines of various types.

Still another object is to provide a cutting arrangement which will avoid interference with standard cloth feeding means and which is capable of running at desired speeds for extended periods of time without breakdown.

These objectives may, we find, be realized in a desirable manner by carrying out a selective cutting operation based on the novel concept of continuously moving a sensing member with the needle bar of the sewing machine and displacing the sensing member vertically upwardly at all times when a workpiece is in the path of travel of the sensing member. At those points at which no workpiece surface is contacted, the sensing member moves into a sensing aperture in the machine base and this extended travel of the sensing member initiates a cutting movement.

In carrying out the method of the invention, we employ a vertically adjustable knife or cutter member which is supported in the presser foot bar of the machine and which normally remains in a rest position during the conventional stitching operation. In the relative position noted, the cutter member may be selectively actuated at predetermined points by sensing mechanism which operates through a conveniently located aperture in the work supporting base of the machine to avoid interference with the bobbin movement and to sense when a cutting operation should be carried out.

The nature of the invention and its other objects and novel features will be more apparent from the following description of preferred embodiments selected for purposes of illustration and shown in the accompanying drawings, in which:

FIGURE 1 is a side elevational view of a conventional sewing machine having the cutting mechanism of the invention attached thereto;

FIGURE 2 is a detail view showing a portion of the needle bar of the machine indicated in FIGURE 1 and further illustrating the cutter mechanism and sensing attachment of the invention;

FIGURE 3 is another elevational view of the cutter and sensing attachment of FIGURE 2 viewed from a rear side thereof;

FIGURE 4 is a cross section taken on the line 4—4 of FIGURE 1 further illustrating the cutter mechanism and sensing attachment together with a special sensing aperture indicated in broken lines in the machine work supporting base;

FIGURE 5 is a detail plan view of the work supporting base taken approximately on the line 5—5 of FIGURE 1 with a cover plate section thereof removed;

FIGURE 6 is a front elevational view of a portion of the sewing machine and showing the cutting mechanism of the invention installed thereon in the position it assumes when the needles and needle bar are in a fully raised position;

FIGURE 7 is a side elevational view of the parts shown in FIGURE 6;

FIGURE 8 is a fragmentary front elevational view of the machine illustrating the needle bar and needles in a lowered position with the needles engaged through a fabric workpiece and further indicating the sensing means of the invention in contact with the fabric workpiece and the cutter means in a raised non-operative position;

FIGURE 9 is a side elevational view of the mechanism as shown in FIGURE 8;

FIGURE 10 is a fragmentary rear elevational view of the cutting and sensing means broken away along one side and shown partly in cross section to indicate the sensing means engaged through the machine base and the cutting knife in a fully lowered position;

FIGURE 11 is a fragmentary side elevational view broken away and shown partly in cross section to further indicate the cutting knife in the position indicated in FIGURE 10;

FIGURE 12 is a detail perspective view of cam and slide mechanism employed for actuating the cutting knife as illustrated in FIGURES 10 and 11;

FIGURE 13 is a fragmentary detail plan view of two portions of cloth indicating stitching applied thereto and a line of cutting extending across threads at approximately the point at which the cutter operates between the workpiece;

Figure 21:
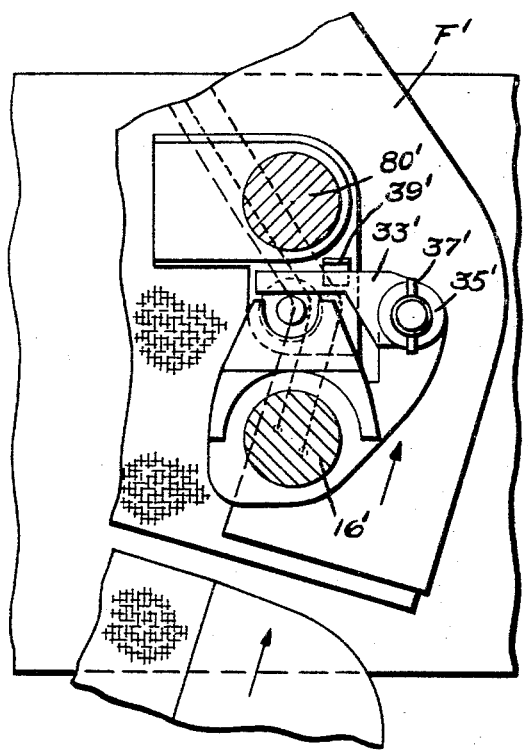
Figure 22:
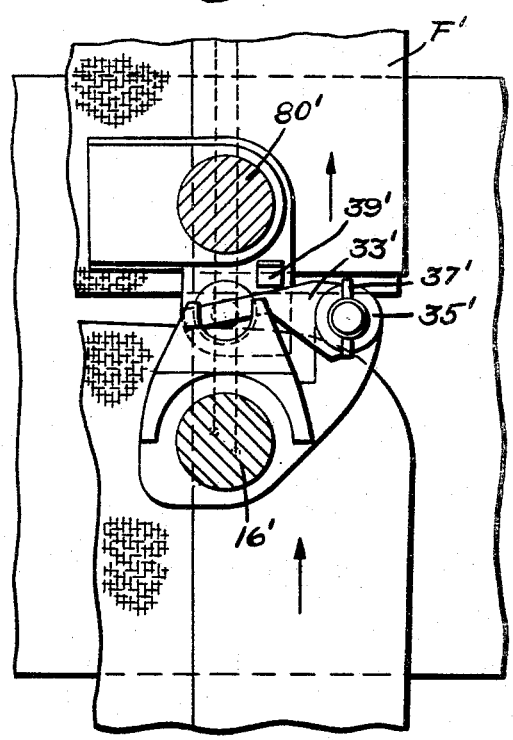
Figure 23:
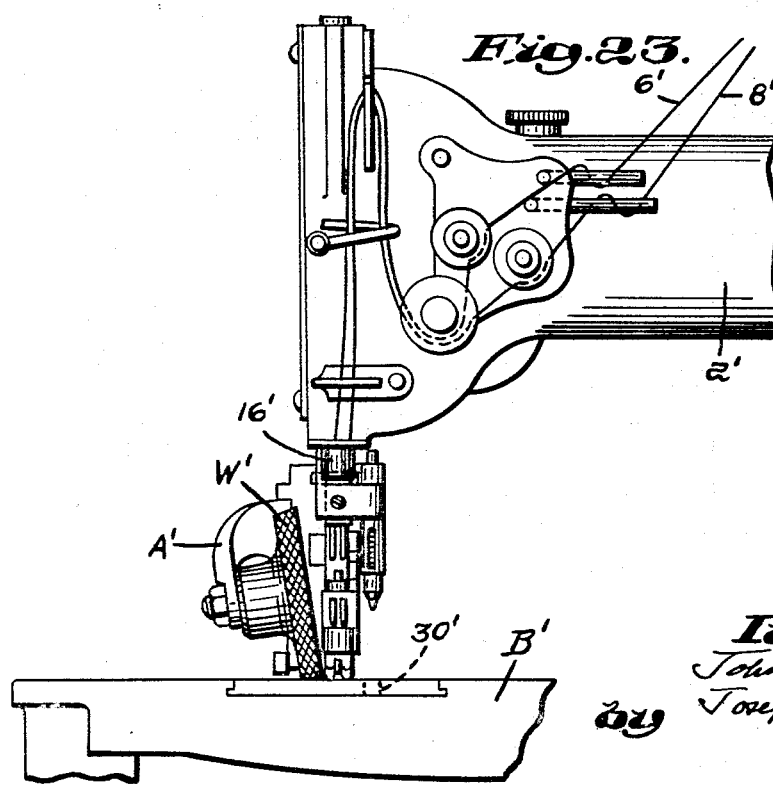

FIGURES 14 to 17 inclusive are diagrammatic views showing a sequence of movements of the sensing means and cutter together with vertically movable cam and slide members which control the sequence of movements;

FIGURE 17a is a detail view illustrating a portion of slide supporting means;

FIGURES 18, 19 and 20 are diagrammatic views showing in sequence positions assumed by a workpiece feeding mechanism in the work supporting base of the machine and further indicating the cutting knife of the invention in corresponding successive positions;

FIGURE 21 is a fragmentary plan view showing a modified form of the invention and indicating two workpieces on a workpiece supporting table of the machine;

FIGURE 22 is another fragmentary plan view of the modification of FIGURE 21 but illustrating the workpieces advanced into a cutting position with respect to the cutting mechanism;

FIGURE 23 is a fragmentary front elevational view of a sewing machine showing in further detail the modified form of the invention of FIGURES 21 and 22;

FIGURE 24 is an enlarged side elevational view of the modification of FIGURES 21–23 and shown partly in cross section to indicate spring actuated sensing means in a raised position;

FIGURE 25 is a fragmentary elevational view showing the sensing means in a lowered position in contact with cloth; and FIGURE 26 is another fragmentary elevational view partly in cross section showing the sensing means of FIGURES 24 and 25 in a fully lowered position in a sensing aperture with the cutter means in a cutting position.

The invention in general relates to a method of continuously applying a stitching material such as thread, tape and the like to successive workpieces and periodically cutting the stitching material without interrupting the operation of the machine. Various classes of workpieces, including specifically small fabric pieces as used in shoe linings, canvas footwear and the like may be handled and the method is essentially concerned with cutting the stitching material at or very near to the point at which one workpiece moves away from the stitching needles and a succeeding workpiece is approaching the needles.

In one preferred embodiment we carry out the invention by advancing a series of workpieces along a work supporting base which is formed with a special sensing aperture located immediately below the path of travel of the workpieces. During the period a workpiece passes along the work supporting base and over the sensing aperture stitches of the material noted are applied, preferably as two rows of stitching. This is accomplished by means of vertically reciprocating needle means of the customary type which pass downwardly through the work supporting table in cooperating relationship with bobbin and thread handling mechanism located below the base.

While the stitches are being applied, each workpiece is periodically engaged by a sensing member which is resiliently supported on the vertically reciprocating needle means at a point directly above the said sensing aperture whereby the sensing member is displaced vertically upwardly by contact with the workpiece during each stitching cycle. At those intervals when a workpiece moves away from the needle means and the sensing member is free to enter the sensing aperture, a cutter is actuated and caused to move downwardly into a cutting position against the stitching material lying across the work supporting base.

In one desirable form of cutter and sensing arrangement a downwardly exerted force on the cutter is transmitted directly from the sensing apparatus through a cam and slide mechanism. In another form a downwardly exerted force is exerted through a pivoting lever device. It should be understood, however, that various other mechanical arrangements may be employed to transmit a downward cutting force and in addition I may desire to employ electrically actuated devices such as a solenoid where energization is selectively controlled by movement of the sensing member described.

Considering in greater detail the various parts referred to, attention is directed to FIGURE 1 wherein we have illustrated a sewing machine 2 having a stitching head 4 to which is supplied strands of stitching material as thread, indicated by numerals 6 and 8 which feed a pair of vertically reciprocating needles 10 and 12 mounted in holder 14 of a needle bar 16. The needles in a lowermost position extend downwardly through needle openings 10a and 17a in a work supporting base B. Customarily a workpiece feed mechanism consisting of a wheel W is angularly supported at one side of the needles 10 and 12 by an arm A attached to the presser foot structure as shown in FIGURE 8. However in some of the figures in the drawings the feed mechanism has been detached for convenience in viewing adjacent machine parts.

In FIGURE 5 the base B is indicated with a detachable cover plate removed to more clearly show conventional bobbin mechanism 18, a bobbin clip 20 and thread engaging members 22 and 24 which rotate in the well-known manner to form stitches. Numeral 26 indicates a feed slot through which projects a feed member 28 also shown in several positions of adjustment in FIGURES 18, 19 and 20.

In accordance with the invention, we form the base B with a special sensing aperture 30. This aperture 30 is located in a position which is chosen with reference to the position assumed by the rotary thread engaging members 22 and 24 when the needles 10 and 12 are in a lowered position so that a sensing member hereinafter described in detail may enter the aperture in timed relationship to avoid interference with the members 22 and 24 during their rotation around the bobbin 18 in the well-known manner.

We have determined that there is a position at which a sensing member may move downwardly through the base and in which position interference with the bobbin mechanism may be avoided, providing that the travel of the sensing member into and out of the aperture is correctly timed. This position is illustrated in FIGURE 5 and as noted therein occurs just outside the bobbin 18, as well as being in the rear of and slightly to one side of the needles 10 and 12. It is pointed out that a basic and important feature of the invention resides in the concept of forming an aperture at this point and the discovery that such an aperture may, as a practical matter, be located immediately above the arc of rotation of the members 22 and 24 as described.

For movement into this sensing aperture 30, we further provide a novel sensing apparatus which includes a support structure 31 (FIGURE 1) having a retaining sleeve 31a adapted to be secured around the needle bar 16 by screws or other suitable fastenings. Slidably mounted for vertical movement in the support structure 31 is a sensing element 32, preferably formed of nylon or some other suitable material. Also associated with the sensing element 32 are a number of additional components which function to provide for resiliently mounted relationship of the sensing member as hereinafter described in detail and which are illustrated in FIGURES 1 to 3, FIGURE 5 and on a somewhat larger scale in FIGURES 6 to 12 inclusive and in FIGURES 14 to 17.

As shown in the figures noted, the sensing element 32 is formed with a lower extremity chosen of a size to enter freely into the aperture 30 in the base. At its upper part the sensing element includes a shouldered portion 34 which is designed to overlie and at some points to abut against adjacent surfaces of the base immediately surrounding the aperture 32. Secured to the upper part of the sensing element 32 is a vertically movable cam 36 which has been indicated removed from the machine as noted in FIGURE 12.

As will be observed from an inspection of FIGURE 12 the cam 36 consists of a relatively thin plate or strip of material such as steel or other substance recessed along one edge and formed with cam surfaces 36a, 36b and an L-shaped top extremity 36c. Vertically disposed at one side of this combined sensing and cam structure is a guide rib 38 which is shown in FIGURE 7 and which is adapted to be guided in a recessed guide sleeve 40 secured to the support structure 31 by means of screws as 42, 44 and 46 as indicated in FIGURE 7.

The guide sleeve portion 40 is adapted to cooperate with a channeled part 48 formed in the rear surface of the support 36 as indicated in FIGURE 17a. This guide sleeve 40 is constructed with a hollow part to provide a spring receptacle in which is vertically disposed a coiled spring 50 as shown in FIGURES 8 and 9. The bottom of the coiled spring is retained about a stud portion 52 formed at the top of the guide rib 38. At its upper end the coiled spring is resiliently retained against the underside of a slide retaining channel member 54 which is secured to the support structure 31 at the upperside thereof by means of fastening screws as 56. By means of this arrangement it will be observed that when the needle bar moves downwardly the sensing member 32, if engaged against a workpiece, is displaced upwardly against the action of the spring 50 and immediately returned to a starting postion when the needle bar moves upwardly.

Also received against the supporting structure 31 and slidably contained by the channeled member 54 is a transverse knife actuating slide 60 which in one position of the sensing element 32 can engage a knife apparatus described below. In the positions assumed by the sensing element during application of stitches to a workpiece, the slide is periodically moved into a displaced position in a slideway 62 as shown in FIGURE 17a and more clearly indicated in FIGURES 9 and 10. In this displaced position the slide 60 cannot engage the knife apparatus. In order to accomplish the movements described, we form one side of the slide 60 with engaging surfaces 60a and 60b as indicated in detail in FIGURES 14 to 17 inclusive and also in FIGURES 9 and 10. These engaging surfaces 60a and 60b are spaced apart to define a slot 75 through which extends the L-shaped part 36c of the cam 36. As shown in FIGURES 14 to 17 inclusive the L-shaped part 36c extends over the top surface of the slide in one position and is adapted to move away from the top surface of the slide 60 in other positions during movement of the sensing member 36 from contact with a workpiece on the work supporting base.

As noted above, when the needle bar 16 is moving downwardly it carries with it the sensing support 31 and the channeled part 54, together with the slide 60, cam 36 and sensing element 32 which is attached at the bottom of the cam 36. At a point where the sensing element comes into contact with the table or workpiece, however, the cam 36 and sensing element 32 are held stationary while the slide 60, support part 31, and the channeled part 54 continue downwardly a further distance. If the sensing element 32 is arrested by engagement of the shouldered part 34 against the table, the slide 60 is moved downwardly over the cam a short distance without lateral displacement taking place. If, however, the sensing element 32 stops by reason of contact with a workpiece, the slide 60 is moved downwardly a greater distance on the cam by part 31 and the channeled part 54 in a manner such that lateral displacement of the slide occurs.

An important feature of the cam and slide arrangement consists in forming the surfaces 60a and 60b with a degree of angularity which corresponds very closely to the degree of angularity of the cam surfaces 36a and 36b and at the same time providing for vertical movement of the slide downwardly over the cam for a short distance before the surfaces can come into engagement. By means of this arrangement, when the parts 31 and 54 are moving downwardly with the sensing element 32 and cam 36 held stationary, two conditions are possible. In one case where the sensing element 32 has passed through the sensing aperture 30 on the table, the slide is not displaced laterally and moves down into a knife actuating position to contact the head of the cutting knife apparatus described below. In a second case where the sensing element 32 has moved into contact with a workpiece, the parts 31 and 54 move the slide 60 downwardly over the cam and also laterally to one side so that no contact with a knife head can occur.

The various positions of the slide 60 relative to the cam 36 as described above, are illustrated in FIGURES 14–17 in more detail. Assume that a workpiece has been stitched and is moved away from the sensing aperture 30 leaving a thread to be cut. FIGURE 14 illustrates the slide 60 and cam 36 moving downwardly with the sensing element 32 not in contact with any surface. The slide 60, it will be noted, is located around the upper part of the cam in spaced relation above the cam surfaces 36b and 36a. It will also be observed that the slide has one end located immediately above the knife apparatus shown diagrammatically and consisting of a knife 70 in a housing 72.

FIGURE 15 illustrates the sensing element 32 entered in sensing aperture 30 and having the part 34 engaged aganist base B with the slide having been moved downwardly over the cam a short distance, without the cam surfaces being engaged. In this position the slide is directly above the knife ready to start a cut.

FIGURE 16 illustrates the slide 60 moved downwardly into engagement with the knife without any lateral displacement having taken place and with the sensing element 32 still extending downwardly through the sensing aperture 30. In this position the knife 70 is in a cutting position with respect to a thread or threads on the base B.

Now assuming that a new workpiece to be stitched is advanced over the sensing aperture 30, FIGURE 17 illustrates the sensing element 32 moved into contact with the fabric F. The slide 60 has now been moved downwardly by the parts 31 and 54 over the cam with the result that the cam surface 36a has engaged the slide surface 60b and displaced the slide from left to right as suggested in FIGURE 17. With the slide moving from its dotted line position into the full line position shown, no cutting can occur. As soon as the needle bar starts to move upwardly, the spring-loaded cam moves relative to the slide in becoming extended and surface 36b engages the surface 60a of the slide and produces displacement of the slide back into the position shown in FIGURE 14.

The vertically movable knife mechanism is shown on a somewhat enlarged scale in FIGURES 10 and 11 and includes a housing 72 and a knife element 70. The housing 72 is secured in some convenient manner as, for example, by a bracket part 74 (FIGURE 7) to a presser foot holder 78 by means of a holding screw 76. The presser foot holder is formed with a cylindrical opening through which is received the presser foot bar 80 in the well-known manner. The housing member 72 is also formed with a vertical bore 82 in which is contained a plunger 84. Transversely disposed through the bottom of the plunger 84 is a pin 71 which supports the knife element 70 in a pivoted fashion and in contact with an adjacent surface of a presser foot member 88. The knife element preferably consists of a V-shaped body having a cutting edge 70a.

Located around the plunger 84 in the vertical bore 82 is a coiled spring 86 which normally functions to hold the plunger 84 and the attached knife element 70 in a raised position such as suggested in FIGURE 10. The plunger and knife at its lower portion is guided through an opening formed in the presser foot extension 90 being in turn solidly secured to the housing 72 as shown in FIGURE 11.

Thus it will be apparent that the knife or cutter 70 is normally held by the spring 86 in a raised position as shown in FIGURE 7 and will remain in this position at all times when the sensing member 32 is not displaced by a workpiece on the work supporting base B. However, in the event that the sensing member 32 is displaced by a workpiece, as may occur during the interval when one workpiece is leaving the needles and a succeeding workpiece is approaching the needles, then the sensing member 32 moves downwardly with the cam actuating the slide. In such case the cam and slide move downwardly together for a short distance into contact with an anvil portion 102 formed at the top of the plunger 84. As a result the knife element 70 is forced downwardly into a cutting position as illustrated in FIGURE 11 and applies a cut along a line indicated diagrammatically in FIGURE 13 and denoted by the reference numeral 104. This line of cutting extends across two threads of stitching material 106 and 108 also shown in FIGURE 13 wherein the two threads extend between two separated workpieces W1 and W2 and a desired separation of the workpieces is accomplished.

In operation with the parts assembled on the respective needle bar 16 and the presser foot bar 80 as disclosed, the machine operator advances a workpiece along the base B and under the feed wheel W. The operator then starts the stitching operation during each cycle of which the needle bar 16 moves from a fully raised position into a fully lowered stitching position and then back to the starting position while the presser foot bar remains stationary.

With the needle bar and attached sensing means in a raised position as suggested in FIGURES 6 and 7 for example, the knife element 70 is supported in a rest position on the presser foot bar 80 and is out of contact with the workpiece. The needle bar moves downwardly carrying with it the sensing apparatus including the sensing support 31, the sensing member 32, and the cam and slide assembly. It is pointed out that all of these parts move downwardly together until the sensing member 32 contacts the workpiece through which the stitches are being applied by the needles 10 and 12. At the point of contact of the sensing member 32 with the workpiece, downward travel of this sensing member is arrested while the supporting structure 31, in which the sensing member 32 is slidably received, continues to move downwardly a further distance carrying with it the slide 60. FIGURE 17 illustrates diagrammatically the sensing member 32 in contact with a workpiece.

As the needles and supporting structure 31 continue to move downwardly after the sensing member contacts the cloth as suggested in FIGURES 8 and 9, the slide 60 is carried downwardly to engage the cam surfaces 36a and 36b and the slide is displaced both transversely and downwardly out of alignment with the knife anvil part 102 as suggested in the dotted line position of FIGURE 17. As the needle bar moves upwardly the sensing apparatus moves back to a starting position. This stitching cycle and travel of the sensing apparatus is continuously carried out as described and thus the slide is always moved out of contact with the knife anvil 102 as long as a workpiece is present on the base B in a position to overlie the sensing aperture 30.

However, when a stitching operation has been completed and the stitched workpiece moves away from the needles to be replaced by a succeeding workpiece, there is an interval during which the sensing member does not contact any workpiece surface and may, therefore move downward into the sensing aperture 30 in the work supporting base of the machine. In such case the needle bar sensing support 31, sensing member 32, cam 36 and slide 60 all move downwardly together for a short distance from the fully raised position described. FIGURE 14 indicates the relative position of the slide on the cam at this time. The parts continue to move downwardly together until the shouldered portion 34 of the sensing member contacts the base B. At approximately this point the cam is held stationary and the slide is moved downwardly into engagement with the knife anvil 102 as suggested in FIGURE 15. Further travel of the needle bar and sensing support 31 results in the slide forcing the knife downwardly to make a cut.

Engagement of the slide 60 with the anvil 102 continues for only a short interval and then the support 31 moves upwardly raising the sensing member 32 out of the aperture 30 in time to avoid interference with the thread engaging elements 22 and 24. Thus it will be seen that this latter step occurs in a timed manner resulting from the location of the aperture 30 in relation to the periphery of the bobbin 18, as well as the travel of the needle bar. It will also be observed that the knife 70 moves downwardly in timed relation to movement of the feed member 28 which in its conventional travel advances as suggested in FIGURE 18, then drops below the surface of the table as shown in FIGURE 19, and thereafter moves rearwardly as shown in FIGURE 20. The knife 70 thus assumes a cutting position when the feed member 28 is completely below the surface of the table as shown in FIGURE 19. It will be apparent therefore that the method of sensing through the base B is carried out in a controlled manner such that no interference with the bobbin mechanism takes place and cutting is accomplished in the interval in which the feed mechanism is not feeding a workpiece because it is lying below the surface of the base. As a result cutting can take place without cloth interference in the path of travel of the cutting knife.

In FIGURES 21 to 26 inclusive, we have illustrated another form of the invention in which a cutting knife of the general class above described is actuated by a cam and pivoted arm arrangement in place of the cam and slide assembly above described. In this modified form a presser foot bar 80' supports a knife member. A needle bar 16' supports a pivoted arm and a sensing device.

Considering these parts in greater detail, the machine 2' corresponds to the machine already described and having parts bearing the same numerals but primed. The needle bar 16' is shown in FIGURES 23 and 24 and as indicated therein carries a support structure 31' which is secured around the needle bar and which extends rearwardly to locate a sensing device 32' immediately above a sensing aperture 30' in a base B'. The sensing device 32' is vertically movable with the needle bar and is also mounted for vertical displacement in an extended portion of the support 31' as shown in FIGURE 24. This extended portion is constructed with a cylindrical bore and a coiled spring 50' and normally holds the sensing device 32' in an extended position as shown. Thus the sensing device 32, when moved down into contact with a fabric F', will be compressed against the spring 50'. Pivotally secured to the top of the sensing device 32' is an arm 33' which is resiliently held by a notched cylindrical part 35' bearing against a cross pin 37' more clearly shown in FIGURES 21 and 22. The effect of this arrangement is to resiliently hold the arm in a position such as that shown in FIGURE 21 and from which the arm may be resiliently displaced into a position such as that shown in FIGURE 22 when engaged in its downward travel against a beveled cam piece 39'. The cam piece 39' is rigidly mounted on an extension part 41' of a presser foot 43' in turn secured to the presser foot bar 80'. In this bottom of the presser foot 43' is a knife 45' which is resiliently contained in a cylindrical part 49' by a coiled spring 51'. The upper cylindrical end 53' of the cutter 45' projects vertically upwardly as shown in FIGURES 25 and 26 into a position such that it may be engaged by the arm 33' when the latter member has been displaced by the cam 39' during downward travel of the sensing device 32' into a sensing aperture 30' as illustrated in FIGURE 26. The fabric F' is shown fragmentarily in FIGURES 21 and 22 and in FIGURE 26 the fabric F' is indicated after having moved away from the stitching needle and with the knife 45' engaged against thread members 106' and 108' to separate these members.

It will be apparent that the functioning of the machine corresponds essentially to the operation already described with respect to the structure shown in FIGURES 1 to 20 inclusive.

I may also desire to employ other cutter arrangements in which a cutter device is supported for movement in a presser foot member and in which the travel of a sensing means into and out of a sensing aperture in a workpiece supporting base is relied upon to periodically actuate the cutter device. For example, we may provide for actuating the cutter device through an electromechanical apparatus such as, for example, a solenoid constructed and arranged when energized to force the cutter downwardly into a cutting position. In such case the step of energizing the solenoid or other electromechanical device may be in response to movement of a sensing means into a sensing aperture in the manner disclosed in the invention.

Also, the arrangement of cutting means in the presser foot may be employed with electrical actuating devices which are controlled in other ways than by a sensing device moving through a sensing aperture. For example, conventional sensing equipment of various well-known types may be employed. It should also be understood that we may desire to use the arrangement of sensing means and sensing aperture in the particular relationship described with other cutter means than the cutter means in the presser foot. For example, sensing through a sensing aperture may be utilized to energize an electrical switch means for actuating shear type cutters and other forms of cutting mechanisms associated with the machine in various ways other than that shown in the presser foot of the invention.

Various other modifications and changes may be resorted to within the scope of the appended claims in keeping with the spirit of the invention.

We claim:

1. In a method of stitching a workpiece with a stitching material in which method a workpiece is advanced along a work supporting base having a sensing aperture, the stitching material and stitching needles supported in reciporcated needle bar means are moved through a presser foot into the workpiece, the steps which comprise resiliently supporting a cutter device in a raised position in the presser foot moving a sensing element attached to the reciprocated needle bar means against the workpiece while the latter member is passing under the presser foot and periodically moving the sensing element downwardly through the sensing aperture when the workpiece moves away from the presser foot and simultaneously actuating the cutter device thereby to cut the stiching material.

2. A method according to claim 1 in which the sensing element as it periodically moves into the sensing aperture passed through the path of rotation of a bobbin threading mechanism in the work supporting base and the travel of the sensing means into and out of the aperture is timed to avoid interference with the rotating thread engaging elements in the bobbin mechanism.

3. Method of continuously applying a stitching material to workpieces advanced along a work supporting base and under a presser foot and cutting the stitching material at predetermined intervals, said method including the steps of advancing successive workpieces along the work supporting base and across a sensing aperture formed therein below the path of travel of the workpieces, applying stitches to the workpieces by means of vertically reciprocating needle means located above the work supporting base, intermitently engaging each of the workpieces with a sensing device which is resiliently supported on the vertically reciprocating needle means at a point directly above the said sensing aperture in the work supporting base whereby the sensing member is displaced vertically upwardly during each stitching cycle, periodically moving the sensing element through the sensing aperture to sense travel of stitched workpieces away from the reciprocating needle means, and simultaneously actuating a cutter element to cut the stitching material attached to the stitched workpiece.

4. A method according to claim 3 in which the cutter element when actuated moves downwardly through the presser foot.

5. A method according to claim 4 in which the sensing device moves into and out of the sensing aperture in timed relationship to operation of the stitching needles.

6. In a sewing machine of the class described a work supporting base, a presser foot bar and a presser foot arranged thereon to overlie a workpiece on the said base, a vertically oscillatable needle bar, needle means fixed in the needle bar in a position to move downwardly through the presser foot and applying a stitching material to the workpiece, a cutting device mounted in the presser foot sensing means attached to the needle bar and means responsive to the sensing means for actuating the cutting device and moving it into a cutting position.

7. A structure according to claim 6 in which the presser foot is formed with an extension in which is constructed a vertical passageway and said cutting device includes a cutter element and a plunger resiliently supported in the said passageway and means for actuating said plunger.

8. A structure according to claim 7 in which the means for actuating the plunger is responsive to movement of the needle bar.

9. In a sewing machine of the class described, a work supporting base having a sensing aperture formed therein, a vertically oscillatable needle bar and needle means for applying a stitching material to a workpiece advanced along the base, a sensing device attached to the needle bar and movable into and out of the sensing aperture in the work supporting base, and cutter means responsive to movement of said sensing member for cutting the stitching material at predetermined points when the needle bar is operating.

10. A structure as defined in claim 9 in which the work supporting base includes a bobbin mechanism and thread engaging members recessed therein and the sensing member in its lower most position moves in timed relation to feeding of said stitching material through the bobbin mechanism at points below the surface of the work supporting base.

11. A structure as defined in claim 10 in which the sensing member is constructed and arranged to move into and out of the sensing aperture and across the said path of travel of the stitching material through the thread engaging members of the bobbin mechanism below the work supporting base without interference therewith.

12. A structure as defined in claim 9 in which the sensing member includes a selective cutter actuating mechanism and the said cutter means is mounted on the machine in a position to be engaged thereby when the sensing member is in a lowered position in the sensing aperture.

13. A structure as defined in claim 9 in which the selective cutter actuating mechanism includes an electromechanical controlled apparatus.

14. In a sewing machine having a work supporting base with a sensing aperture therein vertically oscillating needle bar, needle means fixed at the lower end thereof, and a presser foot bar for supporting a presser foot in a position to guide a workpiece to said needle means, the combination of cutting mechanism including a vertically adjustable cutter element slidably supported on the presser foot bar normally supported above the line of stitching of the needle means and a cutter actuated mechanism attached to the needle bar and vertically movable into the sensing aperture for periodically moving the cutter into a cutting position.

15. In a sewing machine of the class which includes a work supporting base, a vertically oscillatable needle bar and needle means for applying stitches to a workpiece advanced along the base, the combination of a yieldable sensing member attached to the needle bar and movable therewith, said work supporting base being recessed to form a sensing aperture into which the sensing member may move in one position of the needle bar, and cutter means mounted on the sewing machine and operable in response to movement of the sensing member into the sensing aperture to cut a fastening material resting upon the work supporting base.

16. A structure as defined in claim 15 in which the sensing member includes at the upper end thereof a cam actuated mechanism for selectively engaging the cutter means.

17. In a sewing machine of the class described a work supporting base having formed therein needle passageway means and a sensing aperture located in close proximity to the passageway means, a stationary presser foot mounted in the machine in a position to guide a workpiece advanced along the work supporting base, said presser foot including a cutter holding extension having an opening formed therein and a cutter element resiliently received in said opening, said cutter presenting an upper projecting part, a vertically oscillatable needle bar and needle means for applying a stitching material to a workpiece located under the presser foot, sensing means detachably secured to the needle bar and including a sensing support having a slideway formed thereon, a sensing element resiliently supported in the slideway for displacement vertically upwardly and being located to enter into the said sensing aperture in the base when a workpiece is not present on the base, a cam and a slide mechanism attached to the sensing element, said slide mechanism being movable by said cam into engagement with the projecting part of the cutter element to actuate same at predetermined points.

18. A structure according to claim 17 in which the cam and slide mechanism comprises a transversely movable slide having cam engaging surfaces which occur in the path of movement of the cam during reciprocation of the needle bar.

19. In a sewing machine of the class described a work supporting base having formed therein needle passageway means and a sensing aperture located in close proximity to the passageway means, a stationary presser foot mounted in the machine in a position to guide a workpiece advanced along the work supporting base, said presser foot including a cutter holding extension having an opening formed therein and a cutter element resiliently received in said opening, said cutter presenting an upper projecting part, a vertically oscillatable needle bar and needle means for applying a stitching material to a workpiece located under the presser foot, sensing means detachably secured to the needle bar and including a sensing support having a slideway formed thereon, a sensing element resiliently supported in the slideway for displacement vertically upwardly and being located to enter into the said sensing aperture in the base when the workpiece is not present on the base, a cam and pivoted arm mechanism constructed and arranged to selectively actuate the cutter means.

References Cited

UNITED STATES PATENTS

| | | | |
|---|---|---|---|
| 1,765,493 | 6/1930 | Lutz | 112—252 |
| 2,151,438 | 3/1939 | Pierce | 112—252 |
| 2,423,080 | 7/1947 | Belcher et al. | |
| 2,426,026 | 8/1947 | Kehrer | 112—252 |
| 2,539,627 | 1/1951 | Kindseth et al. | 112—11 |

PATRICK D. LAWSON, *Primary Examiner.*

JORDAN FRANKLIN, J. R. BOLER,
*Assistant Examiners.*